(12) United States Patent
Chen et al.

(10) Patent No.: US 10,736,370 B2
(45) Date of Patent: Aug. 11, 2020

(54) HELMET SYSTEM AND PROTECTIVE WEARABLE SYSTEM

(71) Applicant: LUMEN LABS (HK) LIMITED, Hong Kong (HK)

(72) Inventors: Haoran Chen, Hong Kong (HK); Eu-wen Ding, Hong Kong (HK)

(73) Assignee: LUMEN LABS (HK) LIMITED, Hong Kong (HK)

( * ) Notice: Subject to any disclaimer, the term of this patent is extended or adjusted under 35 U.S.C. 154(b) by 0 days.

(21) Appl. No.: 16/358,735

(22) Filed: Mar. 20, 2019

(65) Prior Publication Data

US 2019/0261724 A1 Aug. 29, 2019

Related U.S. Application Data

(63) Continuation-in-part of application No. 15/319,032, filed as application No. PCT/CN2016/074732 on Feb. 26, 2016, now abandoned.

(Continued)

(51) Int. Cl.
*A42B 3/04* (2006.01)
*A42B 3/08* (2006.01)
(Continued)

(52) U.S. Cl.
CPC ............ *A42B 3/0453* (2013.01); *A42B 3/044* (2013.01); *A42B 3/0433* (2013.01); *A42B 3/08* (2013.01); *A42B 3/125* (2013.01); *A42B 3/30* (2013.01); *B60Q 1/2676* (2013.01); *B60Q 1/38* (2013.01); *B60Q 1/44* (2013.01); *F21V 23/023* (2013.01);
(Continued)

(58) Field of Classification Search
CPC ....... A42B 3/0453; A42B 3/0433; A42B 3/30; A42B 3/125; A42B 3/08; A42B 3/04; A42B 3/06; A42B 3/10; A42B 3/0446; F21V 33/008; F21V 23/0471; F21V 23/0435; F21V 23/0407; F21V 23/023; B60Q 1/44; B60Q 1/38; B60Q 1/2676; F21W 2111/10;
(Continued)

(56) References Cited

U.S. PATENT DOCUMENTS 4,321,433 A * 3/1982 King .................... A42B 3/30
455/344
6,017,049 A * 1/2000 Spector ................ A42B 3/0433
2/425

(Continued)

*Primary Examiner* — Isiaka O Okanbi
*Assistant Examiner* — Fatima N Farokhrooz
(74) *Attorney, Agent, or Firm* — Idea Intellectual Limited; Margaret A. Burke; Sam T. Yip

(57) ABSTRACT

A protective wearable system comprises a helmet for providing protection and enhancing safety to a rider on a vehicle. In one embodiment, the helmet comprises a LED display configured to produce visual information to vehicles and pedestrians surrounding the rider. The helmet further comprises a control module and a communication module configured to establish a point-to-multipoint communication group such that the rider can transmit or receive real-time and/or just-in-time information to other members of a riding group. The protective wearable system further comprises one or more illuminated wearables and accessories configured to produce light signals for clearly depicting silhouette of the rider and synchronized to the helmet for making the rider more visible and identifiable to nearby motorists.

19 Claims, 19 Drawing Sheets

Related U.S. Application Data

(60) Provisional application No. 62/126,579, filed on Feb. 28, 2015.

(51) Int. Cl.

| | |
|---|---|
| *A42B 3/12* | (2006.01) |
| *A42B 3/30* | (2006.01) |
| *B60Q 1/26* | (2006.01) |
| *B60Q 1/38* | (2006.01) |
| *B60Q 1/44* | (2006.01) |
| *F21V 23/02* | (2006.01) |
| *F21V 23/04* | (2006.01) |
| *F21V 33/00* | (2006.01) |
| *F21Y 113/13* | (2016.01) |
| *F21Y 103/10* | (2016.01) |
| *F21Y 115/10* | (2016.01) |
| *F21W 111/10* | (2006.01) |

(52) U.S. Cl.
CPC ...... *F21V 23/0407* (2013.01); *F21V 23/0435* (2013.01); *F21V 23/0471* (2013.01); *F21V 33/008* (2013.01); *F21W 2111/10* (2013.01); *F21Y 2103/10* (2016.08); *F21Y 2113/13* (2016.08); *F21Y 2115/10* (2016.08)

(58) Field of Classification Search
CPC .............. F21Y 2115/10; F21Y 2103/10; F21Y 2113/13
See application file for complete search history.

(56) References Cited

U.S. PATENT DOCUMENTS

| | | | |
|---|---|---|---|
| 8,113,677 B2 * | 2/2012 | Carpenter | F21V 21/084 362/105 |
| 9,445,639 B1 * | 9/2016 | Aloumanis | A42B 3/0453 |
| 2006/0202629 A1 * | 9/2006 | Colwell | A42B 3/044 315/119 |
| 2007/0289044 A1 * | 12/2007 | Ellis | H04B 1/08 2/6.2 |
| 2010/0253501 A1 * | 10/2010 | Gibson | A41D 13/01 340/475 |
| 2012/0304367 A1 * | 12/2012 | Howard | A42B 3/046 2/413 |
| 2013/0214701 A1 * | 8/2013 | Forgey, II | H05B 37/02 315/307 |
| 2014/0292569 A1 * | 10/2014 | Wallace | G01S 19/43 342/357.42 |
| 2015/0146449 A1 * | 5/2015 | Freiser | B62J 6/04 362/523 |
| 2015/0250247 A1 * | 9/2015 | Beckers | A42B 3/044 2/422 |
| 2016/0037849 A1 * | 2/2016 | Shearman | A42B 3/0426 2/424 |

* cited by examiner

HELMET SYSTEM AND PROTECTIVE WEARABLE SYSTEM

CROSS-REFERENCE TO RELATED APPLICATIONS

This application is the continuation-in-part application of the U.S. Non-Provisional patent application Ser. No. 15/319,032 filed on Dec. 15, 2016, which is the national phase entry of the International Application No. PCT/CN2016/074732 filed on Feb. 26, 2016, which claims priority under the Paris Convention to the U.S. Provisional Patent Application No. 62/126,579, filed on Feb. 28, 2015, the disclosures of which are incorporated by reference herein in their entireties.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to a helmet system, a protective wearable system and safety devices for protecting riders of vehicles, including bicycles and motorcycles.

BACKGROUND OF THE INVENTION

The helmet is intended to protect the head in the event of impact. However, most bicycle helmets are not designed to prevent accidents that may result in head impacts or other bodily harm. According to the *Boston Cyclist Safety Report* 2013 published in May 2013 and by the City of Boston, the disclosure of which is incorporated by reference herein, 32% of bicycle accidents are due to motorists not seeing the cyclists; this includes 18% of bicycle accidents that result from "dooring", i.e. when a vehicle door is extended into cyclists (p. 17 of *Boston Cyclist Safety Report* 2013). Another 38% of bicycle accidents result from improper cyclist adherence to traffic rules such as running stop signals and riding into oncoming traffic (p. 17 of *Boston Cyclist Safety Report* 2013). Taken together, 70% of bicycle accidents are due to a combination of poor cyclist visibility and improper adherence to road rules. These accidents could be prevented if cyclists were more visible on the road and shared a common system to communicate their actions on the road.

Furthermore, group cycling may have more safety issues as each member of the group may react to actions by other members in addition to road conditions. For example, a member may speed up in order not to be left behind at intersections or ride harder in the wind in order to stay out of the way of vehicles in the middle of the lane. Therefore, it would be desirable to allow each member to be identified and to communicate real-time or just-in-time information with each other such that the group as a whole can ride smoothly and safely on the road. With bicycle ridership expected to increase significantly in the near term, particularly in urban environments with more traffic, it is important that cyclists are equipped with the proper gear to help prevent accidents proactively.

The conventional bicycle helmet is limited to reactively minimizing impact to the head. The conventional bike helmets are designed with an inner liner typically consisting of expanded polystyrene foam and a plastic outer shell that is adhered to the inner lining with glue and/or tape. This conventional design minimizes head trauma in the event of an impact, but it does not help cyclists avoid impact by being more visible on the road, especially in darkening or dark environments when most accidents occur. (From p. 14 of the *Boston Cyclist Safety Report* 2013, most accidents occur around 5 pm.)

Many cyclists attempt to address this problem by attaching lights or reflectors to their bicycles, helmets or clothing. These solutions are insufficient as most lights and reflectors are too small to be seen or are not bright enough to be seen from a safe following distance. Lamps or reflectors positioned on certain parts of the bicycle such as the wheel or underneath the seat are not visible to motorists on the road from certain angles or following distances. Furthermore, the placement of the lamps and reflectors is unique from cyclist to cyclist. The lack of a standardized, common lighting system can result in motorists, other cyclists and pedestrians not adequately seeing cyclists.

An integrated solution is therefore needed to provide both passive impact protection and also active protection for signaling to cyclists.

Furthermore, helmets have thus far not been well utilized as a platform for additional technology enhancements. As helmets are devices that are often worn in various circumstances, there is an opportunity to use helmets to solve more problems beyond just providing protection for the head.

Multiple ideas have existed to augment helmets with technologies. However, thus far, few have been brought to the market. One reason is that it is a non-trivial issue to be able to integrate electronics into a helmet while maintaining integrity of the helmet that enables it to meet its primary objective, i.e. providing protection to that person's head. For example, bicycle helmets, depending on where one intends to sell them, must pass various standards such as EN1078 and the CPSC 16 C.F.R part 1203. The biggest components of these safety standards are the impact tests.

To incorporate technologies onto a helmet, space must be made to accommodate the electronics. In order to preserve a beautiful aesthetic design of the exterior of the helmet and the helmet in general, the electronics must be "hidden" inside the helmet. However, doing so effectively means removing protective material from the helmet, decreasing its ability to pass the impact tests required of the EN1078 and the CPSC 16 C.F.R part 1203.

There is a need in the art to have a smart helmet and a mechanical design enabled one to resolve the above-mentioned engineering challenge, allowing one to create a helmet that (1) incorporates electronics onto the helmet, (2) effectively hides the electronics from the user, and (3) still passes prevailing safety standards for bicycle helmets. Although the need to have the smart helmet and the mechanical design is evolved from analyzing the need for protecting bicycle riders, the smart helmet and the mechanical design are also useful for protecting riders of other vehicles such as motorcycles.

SUMMARY OF THE INVENTION

A first aspect of the present invention is to provide a helmet for providing protection and enhancing safety to a rider on a vehicle.

The helmet comprises a liner configured to protect a head of the rider. Preferably, the liner is made from high-density impact-absorption foam, enabling the liner to protect the head of the rider. Preferably, the helmet further comprises an upper shell and a bottom shell both for protecting the rider. It is also preferable that the helmet further comprises a harness for enabling the helmet to be fastened to a head of the rider.

The helmet further comprises a control module and a communication module both housed in an electronics box integrated with the liner. The electronics box comprises a bottom plastic housing and an upper plastic housing both configured to form an enclosure when the bottom plastic housing is fitted to the upper plastic housing. Preferably, the electronics box further comprises a battery and a magnetic charging port. In one embodiment, the communication module is a Bluetooth module for communicating with one or more external Bluetooth-enabled devices. In another embodiment, the communication module is a WiFi module for communicating with one or more external WiFi-enabled devices.

The helmet further comprises one or more of proximity sensors for sensing surrounding objects, including vehicles, pedestrians, and other stationary obstacles; and optical sensors (e.g. cameras, ambient light level sensors) for capturing images of surrounding objects, environmental and road conditions; and one or more motion sensors (e.g. inertial sensors) for sensing deceleration of the rider or detecting sharp movement of the rider caused by an accident such as a crash.

The helmet further comprises a light emitting diode (LED) strip installed on the helmet. The LED strip comprises a flexible base and a plurality of LEDs installed on the flexible base. In particular, the LED strip is configured to produce light signals to vehicles and pedestrians surrounding the rider, causing the rider to be more visible to the surrounding vehicles and pedestrians to thereby promote safety to the rider.

Preferably, the plurality of LEDs of the LED strip includes a front-right LED, a back-right LED, a back LED, a back-left LED, a front-left LED, a left brim LED, a right brim LED and a center brim LED. In one realization, each of the front-right LED and the front-left LED is a super-bright dual-color orange and white LED, the back-right LED and the back-left LED are super bright orange LEDs, the back LED is a super bright red LED, the left brim LED and the right brim LED are orange LEDs, and the center brim LED is red. The electronics box is configured to, when the rider is biking straight, control the LED strip such that the back LED is blinking, causing the rider to become more visible to the surrounding vehicles and pedestrians.

The helmet further comprises a LED display installed on the helmet. The LED display comprises a flexible base and a two-dimensional (2D) array of LEDs installed on the flexible base. In particular, the LED display is configured to produce visual information to vehicles and pedestrians surrounding the rider, causing the rider to be able to communicate with the surrounding vehicles and pedestrians using contextual display contents including graphical, textual and/or animated signs to thereby promote safety to the rider. In some embodiments, the graphical, textual and/or animated signs to be displayed in the LED display may be configured and input using a designated mobile computing device (e.g. a smartphone running a mobile app) through the communication module, and stored in the control module. For example, if a motorist is driving too closely to the rider as detected by the proximity sensors, the LED display may display a "Danger" warning sign to warn the motorist to keep a further distance. On the other hand, when the rider perceives safe road manner of a motorist, the rider may command the LED display to display a message of compliment.

Preferably, the LED display includes a configuration of 7 by 11 array optimized to strike a balance between the visible distance range of the helmet and power consumption of the LED display while providing sufficiently rich contextual display contents. As the number of LEDs increases beyond that of the 7 by 11 array, the power consumption becomes excessive or each LED becomes dimmer without a proportionally increased available electrical current. The particular configuration of 7 by 11 array also allows the optimized display of text (e.g. simultaneous display of two letters scrolling smoothly).

The helmet further comprises one or more speakers, and one or more vibration motors which may be housed in the electronics box. Furthermore, the control module is configured, when detecting an approaching vehicle via the one or more proximity sensors, to control the center brim LED to blink and increase the brightness of the LED strip, and to trigger the one or more vibration motors to vibrate and the one or more speakers to emit alarming sound thus to notify the rider.

The control module may be further configured to, when the one or more motion sensors senses deceleration of the vehicle, change the illuminated pattern of the LED strip such that the back left LED, the back LED, the back right LED are kept on until the vehicle comes to a stop; and control the LED display to display a warning sign indicating the deceleration of the vehicle to warn the other members behind to keep a safe following distance.

In some embodiments, the helmet may further comprise a microphone housed in a microphone arm extended from the helmet for allowing the rider to have voice communication. The helmet may further comprise a push-and-talk button installed on the helmet and configured to work with the microphone and the speaker for allowing the rider to have point-to-multipoint communication.

The helmet may have a plurality of operation modes including, but not limited to, an individual riding mode and a group riding mode. The operation modes may be selected with the designated mobile computing device (e.g. a smartphone running a mobile app) through the communication module and stored in the control module.

When the group riding mode is selected, the control module is configured to control the LED display to display a logo to identify the rider from other members of a riding group; and the communication module is configured to establish a point-to-multipoint communication group such that the rider can transmit or receive real-time and/or just-in-time information to other members of the riding group. For example, a member leading the group may command the LED display to display navigational directions (e.g. turn left/right ahead) and oncoming road condition (e.g. "Steep Downward Slop Ahead"). The communication modules of the one or more members' helmets can be configured in master-slave mode in which the contents displayed in the master helmet's LED display is propagated to one or more slave helmets' LED displays. In another example, a group member may send a distress signal to the group when there is an accident. The communication modules of the one or more members' helmets can be configured such that the distress signal, identifying which member needs help and what kind of help, gets propagated to the one or more slave helmets' LED displays.

A second aspect of the present invention is to provide a protective helmet system. The system comprises the helmet according to any embodiment disclosed in the first aspect of the present invention, and a remote control for wirelessly controlling electronics in the helmet to perform functions.

In one option, the remote control comprises a left button, a right button, a mount, where the left button and the right button are positioned on or over the mount. In another option, the remote control comprises a mount having two wired buttons as the left button and the right button.

Preferably, when the rider presses the left button to signal that the vehicle is turning left, the back LED, the left brim LED, the front-left LED and the back-left LED are kept blinking. When the rider presses the right button to signal that the vehicle is turning right, the back LED, the right brim LED, the front-right LED and the back-right LED are kept blinking.

A third aspect of the present invention is to provide a protective wearable system for a rider. The protective wearable system comprises a helmet system according to any embodiment disclosed in the first and second aspects of the present invention, and illuminated wearables and accessories for clearly depicting the silhouette of a rider and making the rider more visible and identifiable to nearby motorists.

In one embodiment, the protective wearable system may include a jacket comprising a first LED strip running from the chest part to the abdomen part of the jacket and a second LED strip running across the lower back of the jacket. Optionally, the jacket may further comprise two LED strips running from the collar to the left and right wrists respectively, which will be used to display the left and right turn signals respectively.

The protective wearable system may further include a pair of gloves, each of the gloves comprising LED patterns, such as arrows, for indicating a left or right turn signal. Each of the pair of gloves may comprise a sensing module for picking up the rider's intention to indicate a left or a right turn. In one option, the sensing module may include a magnetic sensor, such as Hall Effect sensor, positioned on the thumb portion of the glove, and a magnet positioned on the index finger portion of the glove. Alternatively, the sensing module may include a 3-axis accelerometer configured in the glove to sense different orientation of a hand of the rider.

The protective wearable system may further include a bicycle seat comprising a LED strip installed on the rear side of the bicycle seat. The bicycle seat LED strip may include a red LED strip positioned at a center part for indicating a brake signal, and two yellow LEDs positioned at the left and right side of the bicycle seat respectively for indicating left and right turn signals.

The protective wearable system may further include a backpack with a 2D array of RGB LEDs for displaying graphical and/or textual signs.

The control module may be configured to synchronize the wearables and accessories of the protective wearable system to a master device, which is by default the helmet, but can be any other wearables and accessories in the protective wearable system.

The wearables and accessories of the protective wearable system may be configured to blink in a synchronized mode for making the rider more visible and identifiable to nearby motorists.

The control module may be configured to control each of the illuminated wearables and accessories, when detecting the rider's intention to indicate a turn signal, to display the turn signal. If a rider indicates a turn signal with one of the illuminated wearables and accessories, the indicated turn signal will be relayed to other illuminated wearables and accessories of the system and be displayed on all illuminated wearables and accessories of the system.

Other aspects of the present invention are disclosed as illustrated by the embodiments hereinafter.

DETAILED DESCRIPTION

In the following description, for purposes of explanation, numerous specific details are set forth in order to provide a thorough understanding of the embodiment of the disclosure. It is apparent, however, to one skilled in the art that the present disclosure may be practiced without these specific details or with an equivalent arrangement.

Although the invention is hereinafter described in embodiments predominantly based on an example application of the invention to a rider on a bicycle, the present invention is not limited only to applications to bicycles. The present invention is applicable to any vehicles, such as motorcycles, where riders on these vehicles wear helmets for safety and protection.

Exemplarily, the present invention is described by illustrating an exemplary embodiment of the smart helmet and its mechanical design as follows.

In accordance with the exemplary embodiment, a protective smart helmet system is configured such that a rider of a vehicle (especially a bicycle or a motorcycle) is enabled to:
- be more visible on the road;
- be able to communicate the rider's turning intentions to other people around the rider;
- control turn signals on the helmet wirelessly via a remote control;
- be able to communicate the fact that the rider is slowing down to other people around the rider via using a brake signal light feature;
- connect the helmet with the rider's phone or another electronic device, and interact with other application software, activity tracking software, or software to change and control the pattern of lights on the helmet;
- sense when the rider might have been in a crash, and automatically send a signal to a pre-selected emergency contact via a phone or other means through the Bluetooth connection;
- receive audio, visual or haptic feedback via one or more proximity sensors if an object approaches the rider;
- record photographs, video signals and/or audio signals of areas surrounding the rider via an integrated camera; and
- have the rider's head remain protected in an event of impact, the protecting having the same degree as specified and required for all helmets in one or more standards.

According to the exemplary embodiment, a mechanical design of a helmet that incorporates electronics into the design has the following features.

The helmet has a cavity housing the electronics.

In addition, the helmet has a plastic enclosure for enclosing the electronics so as to provide an aesthetic exterior outlook.

The helmet further includes an impact absorbing gel that sits between the enclosure and a liner of the helmet.

The plastic enclosure features a "wing" design that enables the enclosure to share, transfer and distribute stress from the impact to areas surrounding the enclosure, thereby maintaining the helmet's ability to protect the rider's head in an event of impact in order to satisfy the requisite safety standard required for the helmet.

Figure 1:
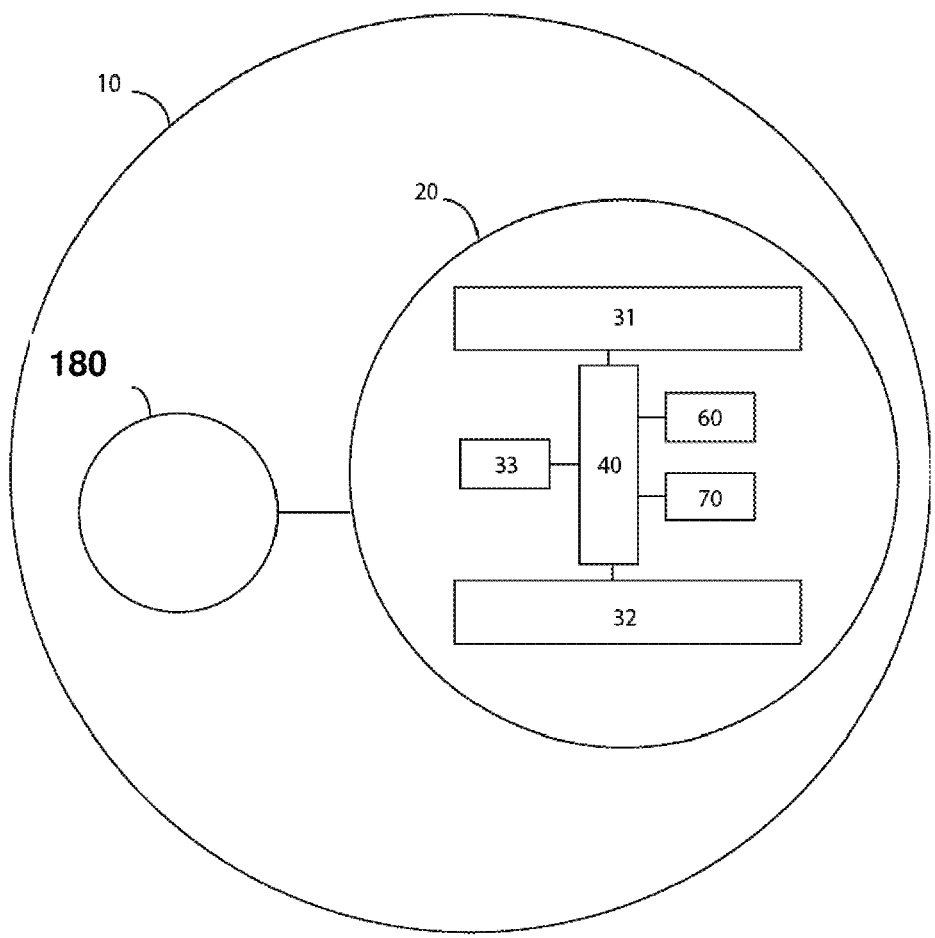
FIG. 1 is a schematic of a protective helmet system in accordance with an exemplary embodiment of the present invention.

FIG. 1 is a schematic representation of a protective helmet system 10 according to one exemplary embodiment of the present invention. The helmet system 10 comprises a helmet 20, a remote control 180, and a designated mobile computing device (e.g. a smartphone running a mobile app) having at least a processor. The helmet 20 comprises an upper shell 31, a bottom shell 32, a harness 33, a LED strip 60, optical sensors (e.g. cameras, ambient light level sensors) for capturing images of surrounding objects, environmental and road conditions and an electronics box 70, all of which are integrated with a liner 40 to form the helmet 20 as described in further detail as follows. The upper shell 31 and the bottom shell 32 are made of hard materials and are means for protecting a rider who wears the helmet 20. The harness 33 enables the helmet 20 to be fastened to the rider's head. The LED strip 60 is installed on the helmet 20, and has plural LEDs for producing light signals such that the rider becomes more visible to surrounding vehicles and pedestrians, thereby promoting safety to the rider. The electronics box 70 is a place for housing (often visually-unbeautiful) electronics for operating the helmet 20 while maintaining a beautiful aesthetic outlook for the helmet 20. The upper shell 31 and the bottom shell 32 may be decorated to generate the beautiful aesthetic outlook.

Figure 2A:
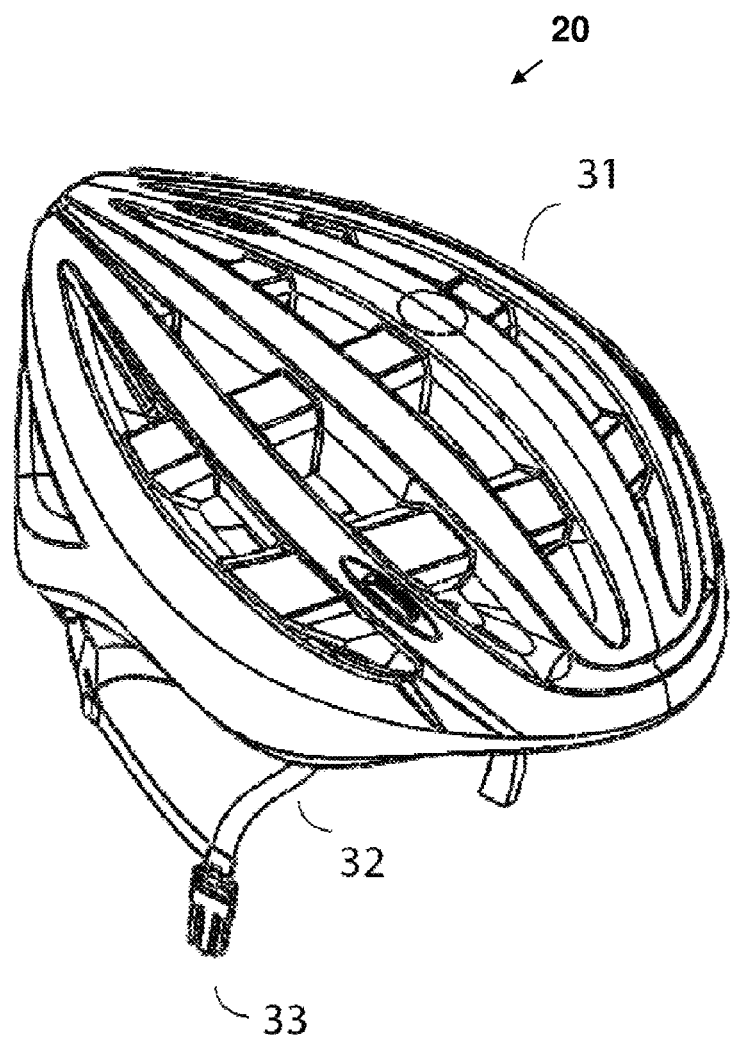
FIGS. 2A, 2B and 2C depict different views of the protective helmet of FIG. 1, where FIG. 2A provides a perspective view while FIGS. 2B and 2C provide two different exploded views.
Figure 2B:
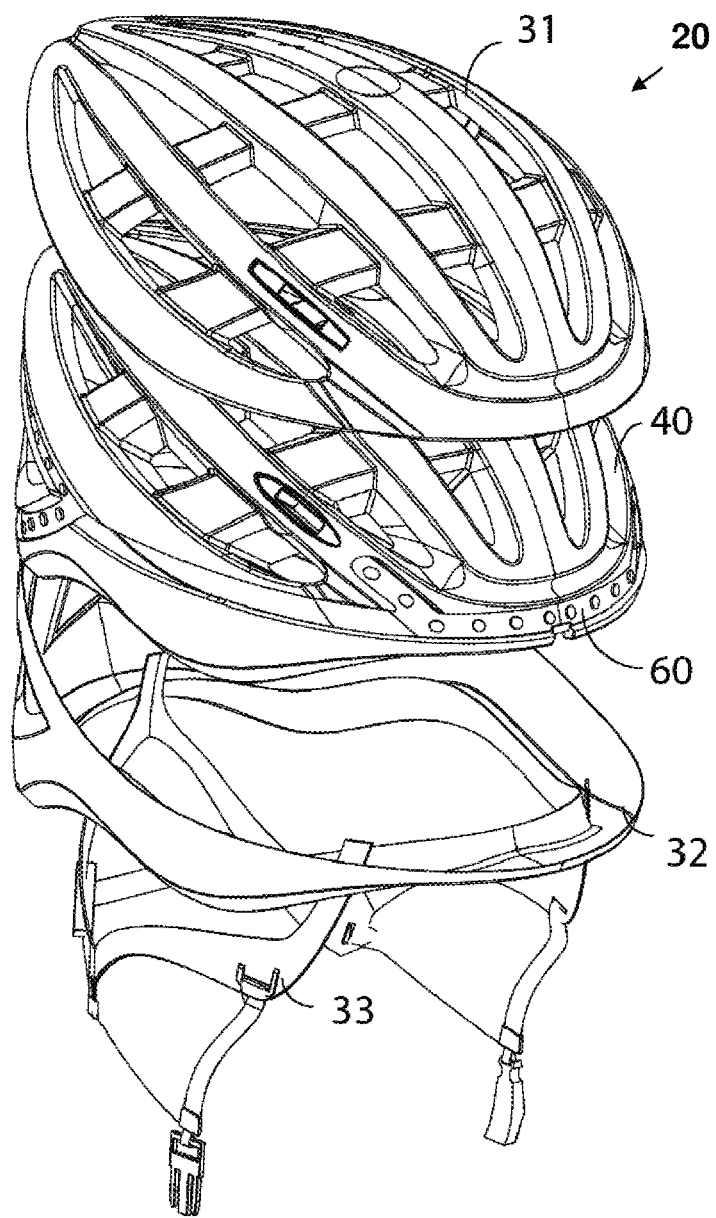
Figure 2C:
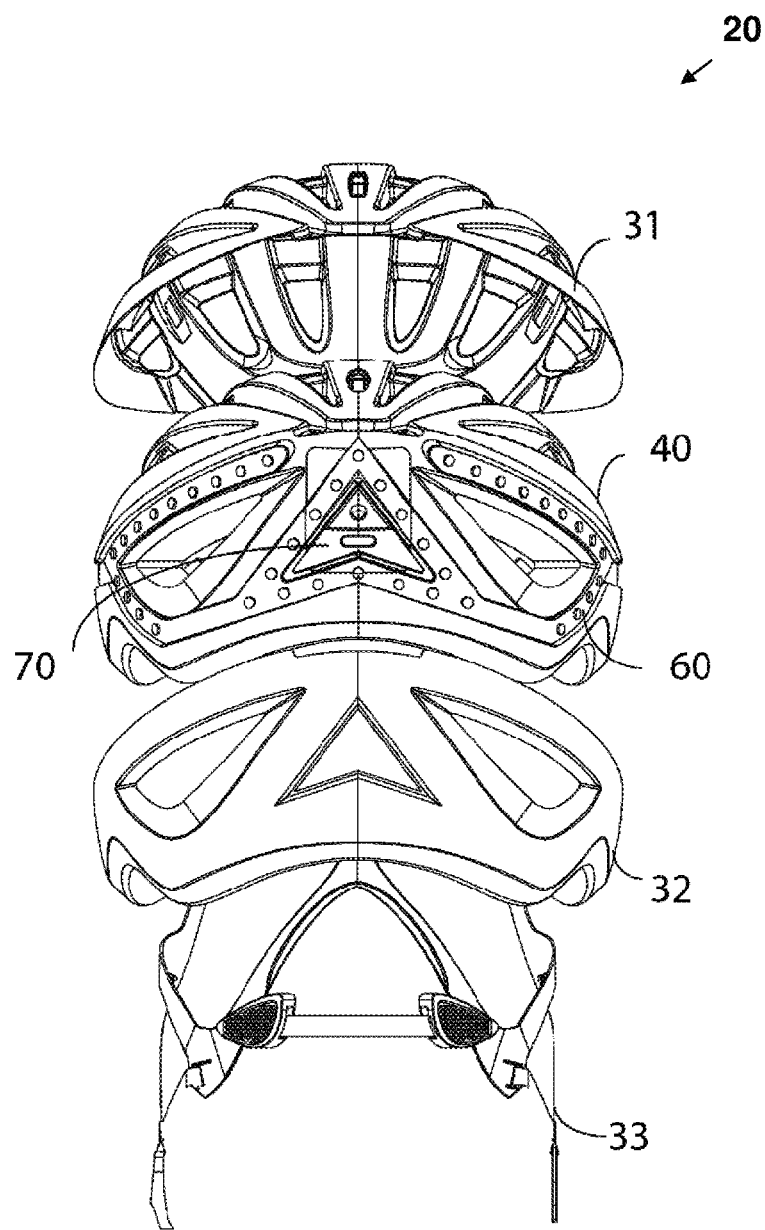

Construction of the helmet 20 is explained as follows with the aid of FIGS. 2A-2C. FIG. 2A provides a perspective view of the helmet while FIGS. 2B and 2C give two different exploded views thereof. The upper shell 31, the LED strip 60, the bottom shell 32 and the harness 33 are attached and integrated to the liner 40 so as to form the helmet 20. Preferably, the upper shell 31 and the bottom shell 32 are vacuum-formed with plastic. The liner 40 is also preferably made from high-density impact-absorption foam having multiple vent holes for ventilation, plural channels for embedding the LED strip 60, plural wells for housing the electronics box 70, and holes for enabling the harness 33 to be fix therein.

Furthermore, the liner 40 is configured to provide safety protection to a rider of the helmet system 10. When the rider is impacted on his or her head, the liner 40 will be deformed, thus absorbing the energy of impact to protect the rider's head.

Figure 3:
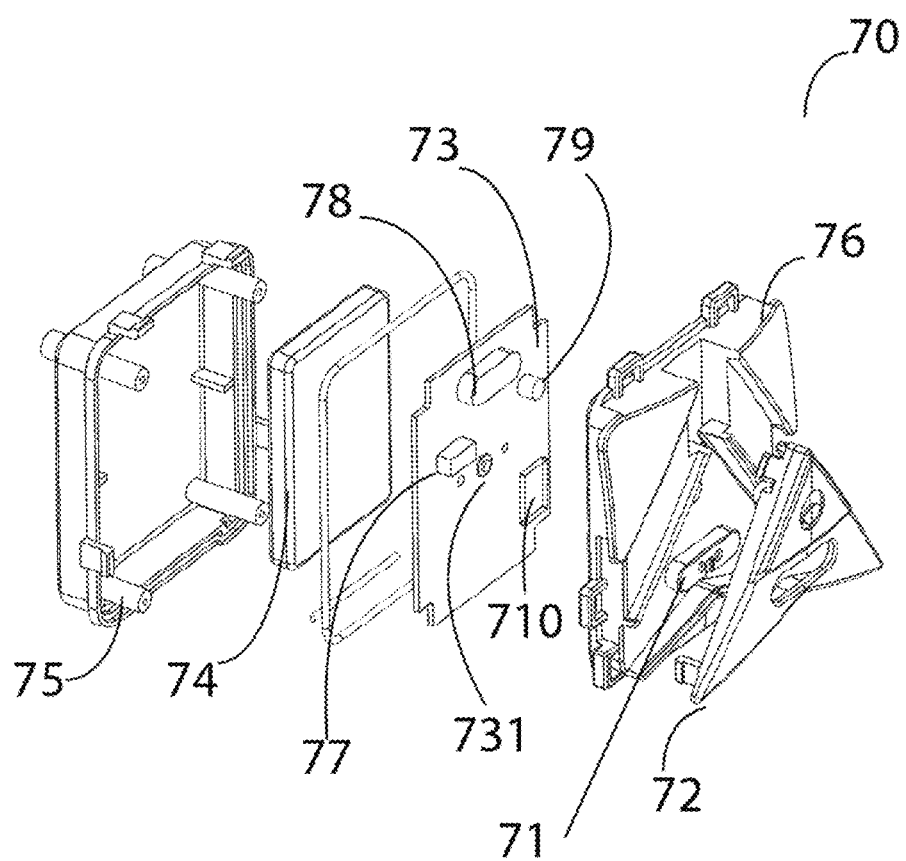
FIG. 3 is a perspective exploded view of the electronic box assembly of the helmet in accordance with one embodiment of the present invention.

FIG. 3 depicts a perspective exploded view of the electronics box 70 of the helmet 20 according to one embodiment of the present invention. The electronics box 70 comprises a bottom plastic housing 75 and an upper plastic housing 76 both configured to form an enclosure when the bottom plastic housing 75 is fitted to the upper plastic housing 76. In one implementation, a PCB board 73 is also installed in the electronics box 70. The electronics box 70 may also include a magnetic charging port 71.

The electronics box 70 may further include a control module (not shown) and a communication module (not shown) configured on the PCT board 73. The control module can connect to the designated mobile computing device through the communication module. In one embodiment, the communication module is a Bluetooth module for communicating with one or more external Bluetooth-enabled devices. In another embodiment, the communication module is a WiFi module for communicating with one or more external WiFi-enabled devices.

In addition, the electronics box 70 may further configured to house a battery 74. In one mode of operation, the control module can transmit the information about the battery 74 to the designated mobile computing device so that the remaining energy on the battery 74 can be displayed.

Figure 4A:
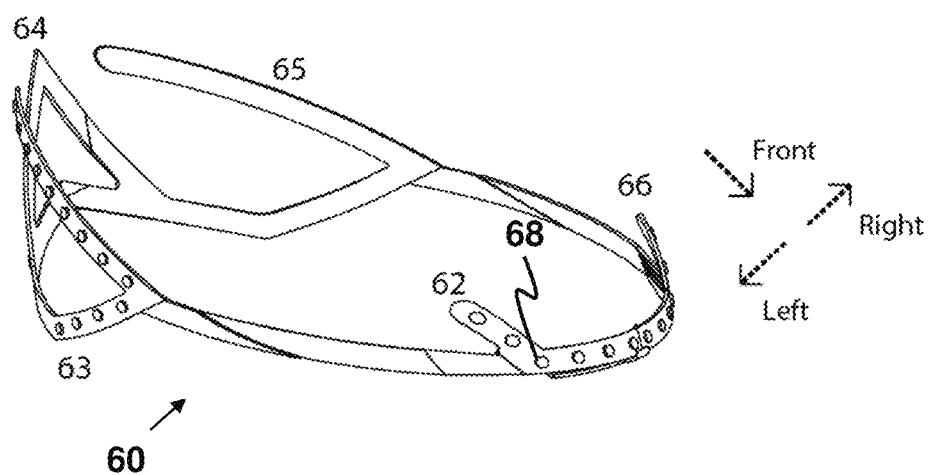
FIGS. 4A, 4B and 4C give three views of a LED assembly of the helmet in accordance with one embodiment of the present invention, where FIG. 4A provides a perspective view, FIG. 4B gives a top view, and FIG. 4C gives a side view.
Figure 4B:
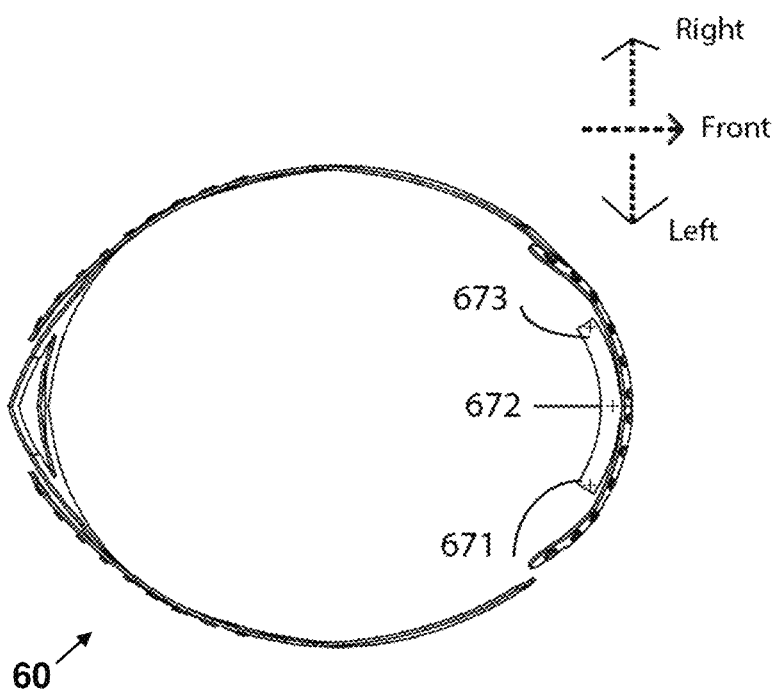
Figure 4C:
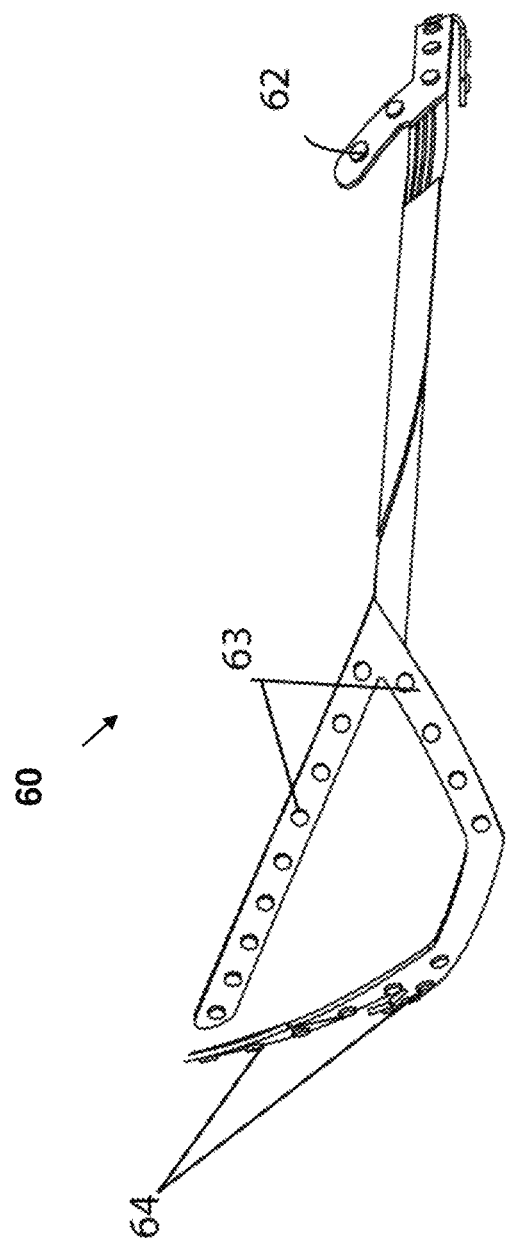

FIGS. 4A, 4B and 4C depict different views of the LED strip 60 in accordance with one embodiment of the present invention. The LED strip 60 comprises a flexible base 68, and a plurality of LEDs installed on the flexible base 68. Preferably, the plurality of LEDs includes a front-right LED 62, a back-right LED 63, a back LED 64, a back-left LED 65, a front-left LED 66, a left brim LED 671, a right brim LED 672 and a center brim LED 673. In one preferred embodiment, each of the front-right LED 62 and the front-left LED 66 is preferably a super-bright dual-color orange and white LED; the back-right LED 63 and the back-left LED 65 are preferably super bright orange LEDs; the back LED 64 is preferably a super bright RED LED; the left brim LED 671 and the right brim LED 672 are preferably orange LEDs; the center brim LED 673 is red.

The electronic box further comprises one or more of proximity sensors 77 for sensing surrounding objects, including vehicles, pedestrians, and other stationary obstacles; one or more speakers 78, one or more vibration motors 79 and one or more motion sensors 710 (e.g. inertial sensors) for sensing deceleration of the rider or detecting sharp movement of the rider caused by an accident such as a crash.

In the normal time when the rider is biking straight, the control module may be configured to signal the LED strip 60 so that the back LED 64 is blinking. In this way, the rider will become more visible to surrounding vehicles and pedestrians. The rider can also designate blinking patterns for the LED strip 60 under different situations.

When detecting an approaching vehicle via the one or more proximity sensors 77, the control module is configured, to control the center brim LED 673 to blink and increase the brightness of the LED strip 60, and to trigger the one or more vibration motors 79 to vibrate and the one or more speakers 78 to emit alarming sound thus to notify the rider. When the control module detects occurrence of high impact on the helmet through the one or more motion sensors 710, the control module can also transmit signal to the designated mobile computing device to trigger emergency call or messaging function on the designated mobile computing device.

Figure 5A:
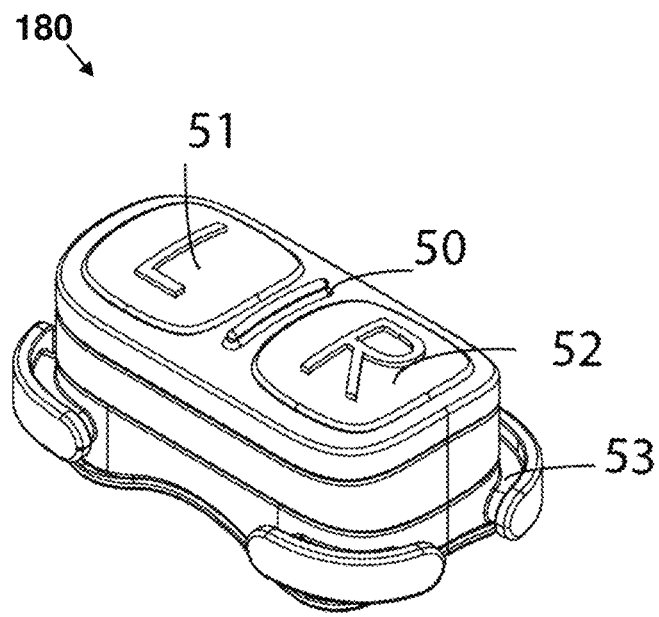
FIGS. 5A-5D show different versions of the remote control of the helmet according to one embodiment of the present invention.
Figure 5B:
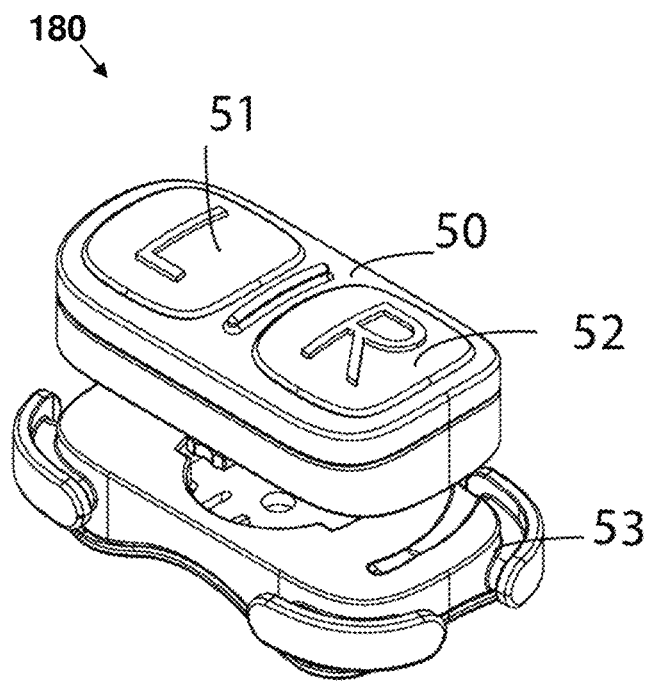
Figure 5C:
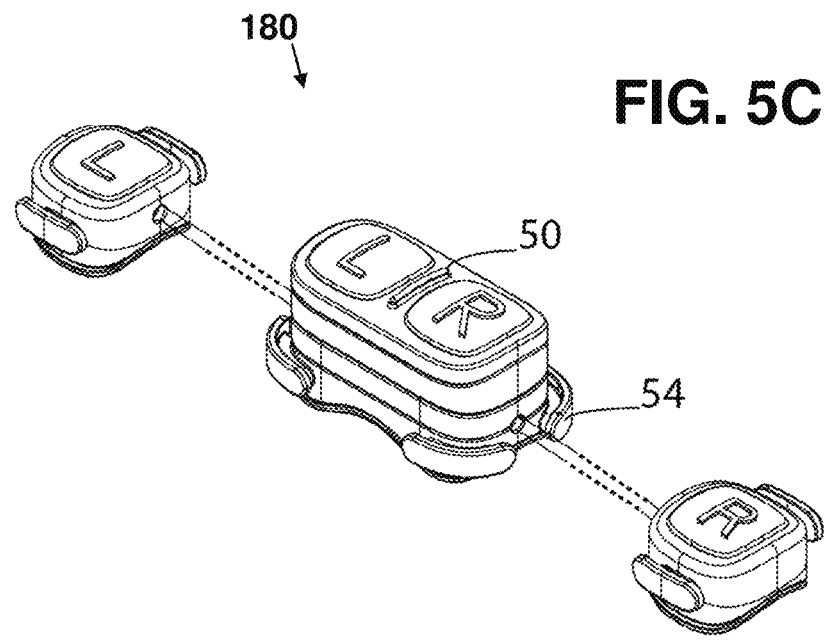
Figure 5D:
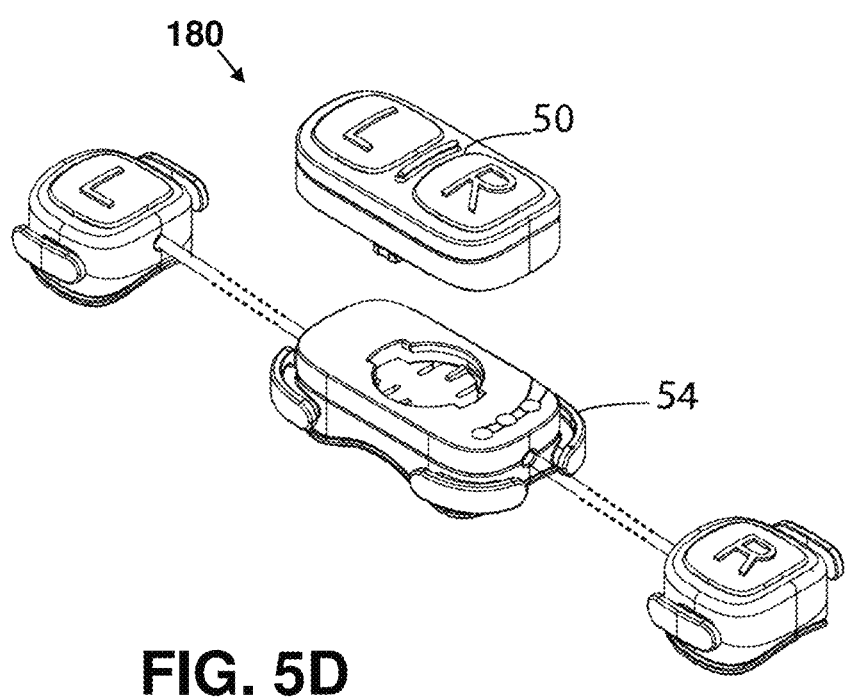

FIGS. 5A-5D depict perspective views regarding different versions of the remote control 180 according to one embodiment of the present invention. Refer to the two versions shown in FIGS. 5A and 5B first. The remote control 180 comprises a left button 51, a right button 52, an electronics box 50, and a mount 53 that is attached to a handle bar of the bicycle (or a handle bar of any vehicle that the rider rides on). The left button 51 and right button 52 are preferably made of soft rubber plastic. It is also preferable that the casing is plastic. Preferably, the mount 53 is plastic. In each of the versions shown in FIGS. 5A and 5B, the left button 51 and the right button 52 are positioned on or over the mount 53. In FIGS. 5C and 5D, there are two other versions each of which has a mount 54 having two wired buttons as a left button and a right button.

Figure 6:
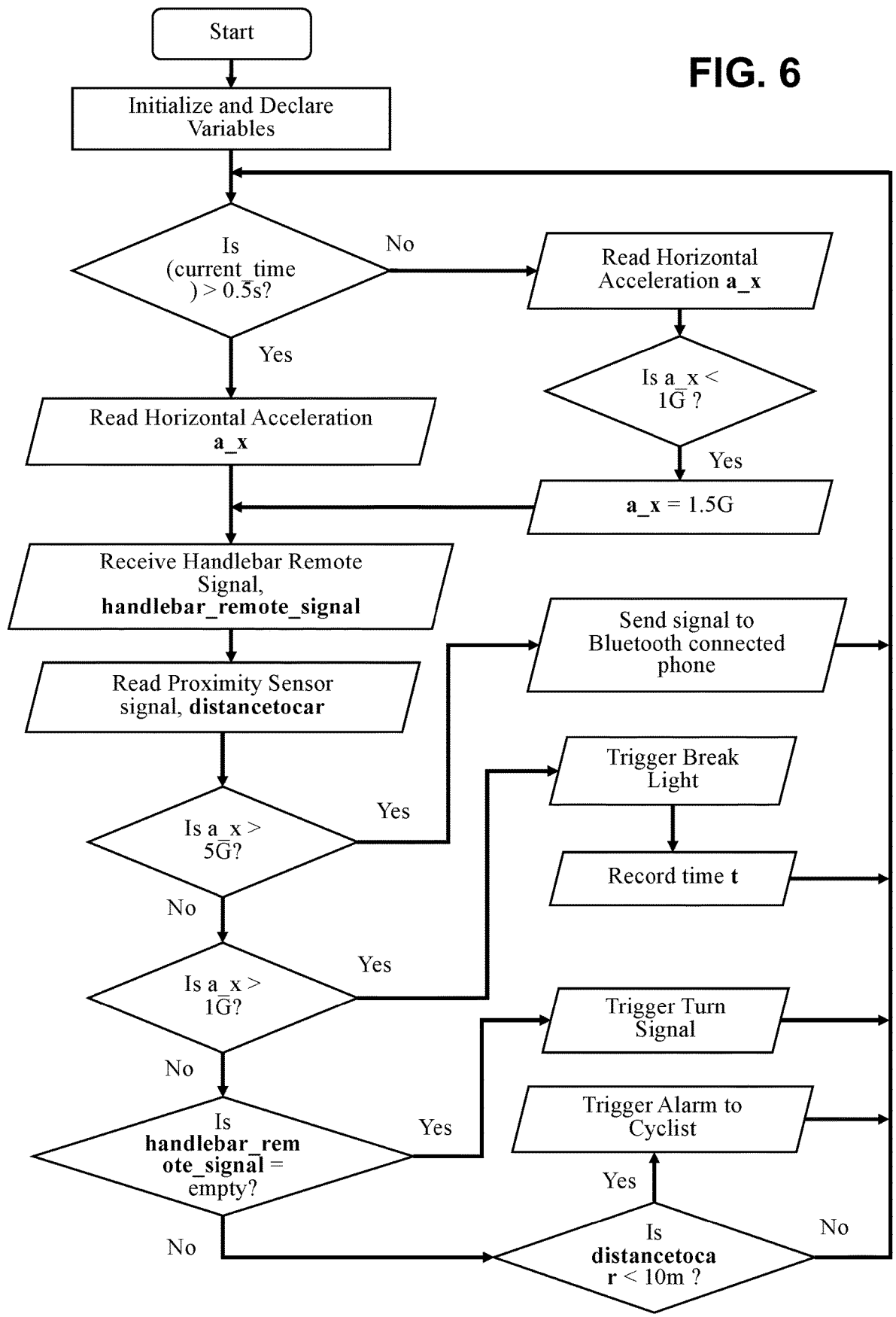
FIG. 6 is a flowchart providing an example to illustrate a flow of steps implemented in a main printed circuit board (PCB) firmware program.
Figure 7:
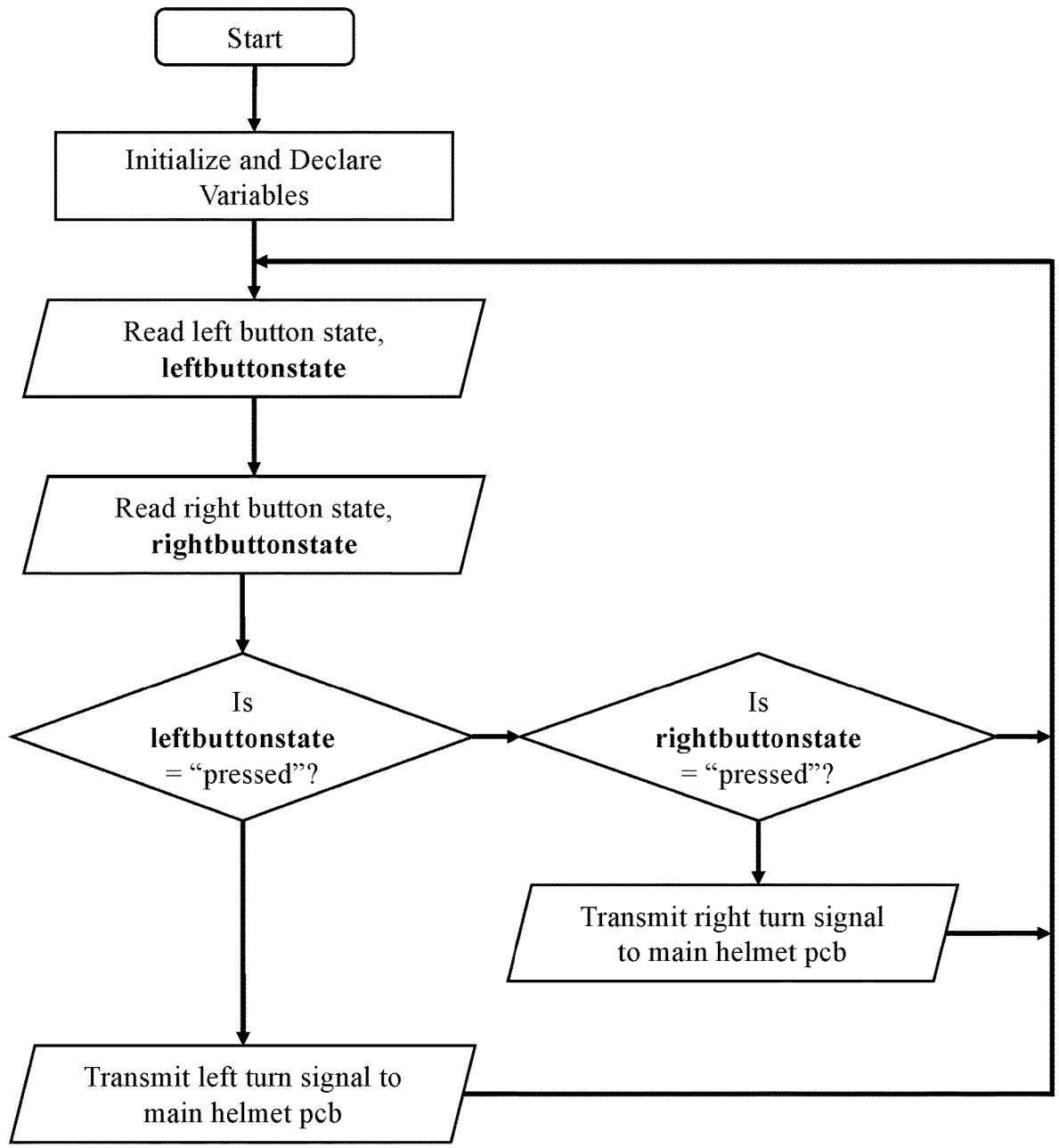
FIG. 7 is a flowchart providing an example to illustrate a flow of steps implemented in a remote control PCB firmware program.

FIGS. 6 and 7 are two flowcharts showing examples of firmware programs implemented in the control module and in the remote control 180, respectively.

Note that it is required to install electronics into the helmet to provide functions thereto. In this regard, one or more electronic boxes, including the electronics box 70, are included in the helmet 20. Advantageously, each electronic box may be designed with a further objective of providing protection to the rider against being impacted by electronic components in the electronic box in case of an accident.

Figure 8A:
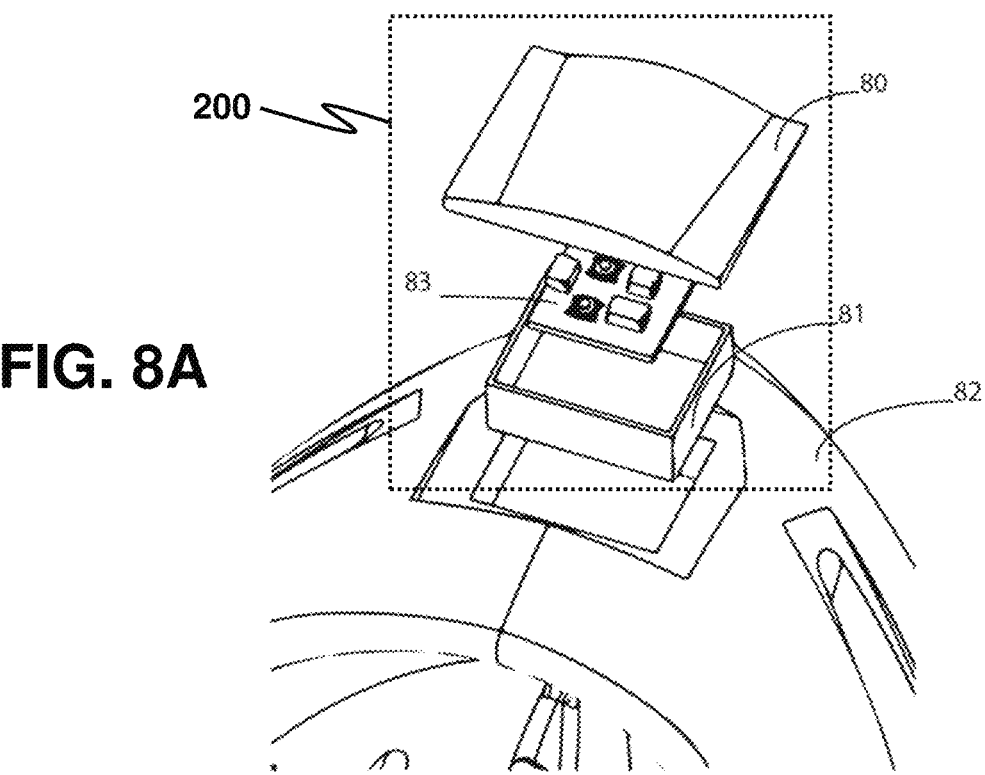
FIGS. 8A, 8B and 8C depict the helmet with the electronic box featuring a wing design in accordance with one embodiment of the present invention, where FIGS. 8A, 8B and 8C provide a perspective exploded view, a bottom cross-section view and a side cross-section view, respectively.
Figure 8B:
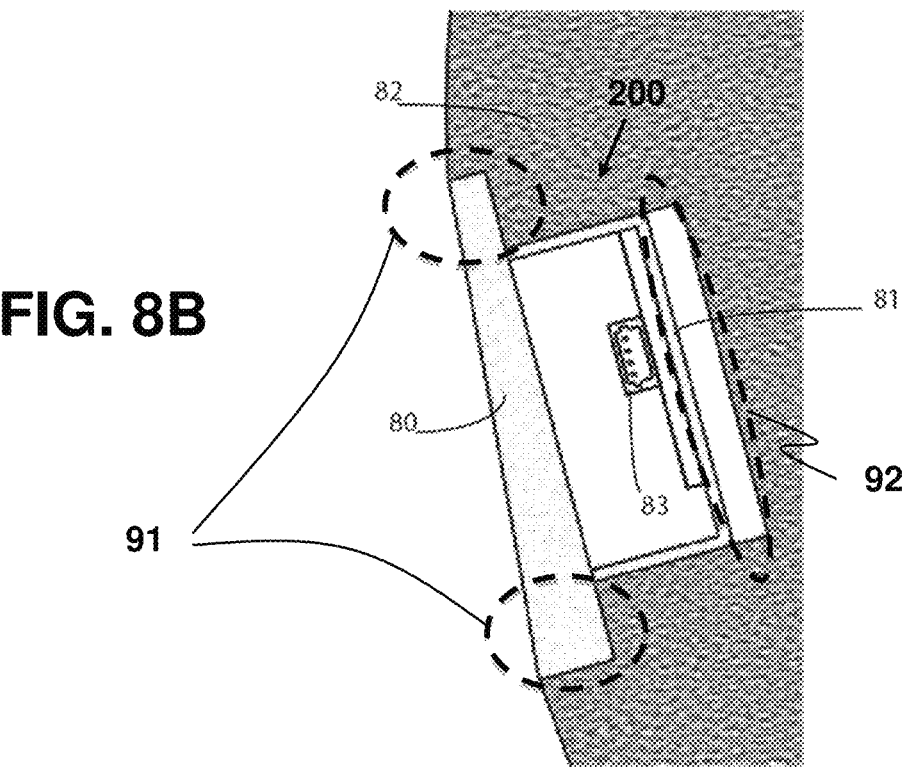
Figure 8C:
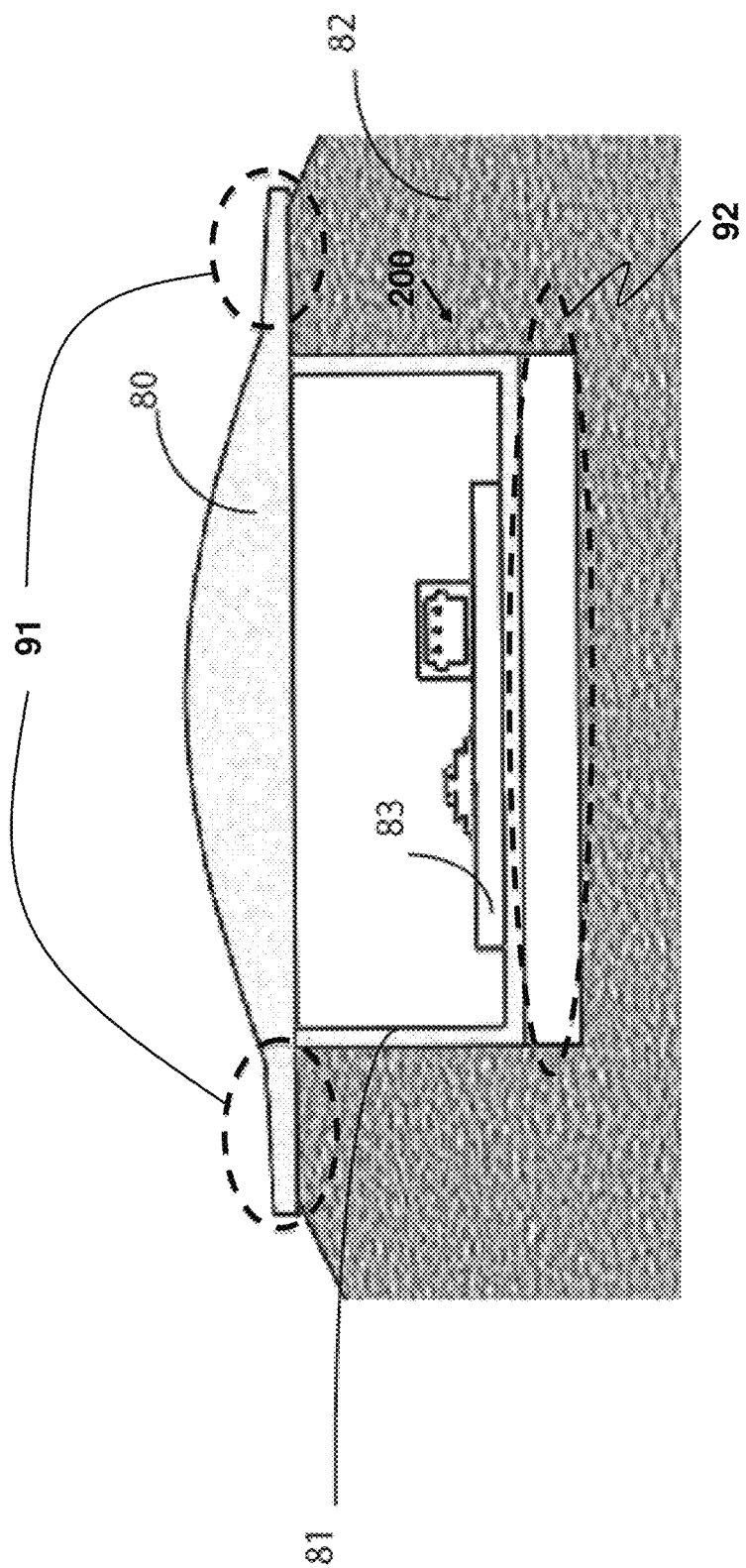

FIGS. 8A, 8B and 8C depict a perspective exploded view, a bottom cross-section view and a side cross-section view, respectively, of a helmet with an electronics box having a wing design in accordance with one embodiment of the present invention. In particular, FIGS. 8A, 8B and 8C illustrate a method of integrating electronics into a helmet 82 with an electronics box 200 that features the wing design. In these figures, a cover 80 of the electronics box 200, a bottom 81 of the electronics box 200, the helmet 82 that the electronics are integrated in, and an exemplary PCB 83 that represents the electronics are shown. How this design enables the integration of electronics into the helmet 82 is through the following two ways.

First, a wing 91 protrudes from the cover 80 that extends the contact of the electronics box 200 to the surrounding helmet section of the helmet 82. During impact, the surrounding area absorbs the impact energy.

Second, a cavity 92 is situated between the bottom 81 of the electronics box 200 and the helmet 82. This cavity 92 prevents the compression of the foam of the helmet 82 beneath the electronics box 200 at the early stage of impact. During impact, the wing 91 transfers the impact energy to the area beneath the wing 91 first as the foam at this area collapse, this cavity 92 shrinks to a point that the foam beneath the bottom 81 of the electronics box 200 also starts to collapse and thus absorbs energy. If this cavity 92 were not there, the impact energy would pass to the foam beneath the bottom 81 of the electronics box 200 at the very first beginning of impact. Thus, more energy will be passed to this area where the foam is thinner because of the existence of the electronics box 200. This cavity 92 thus acts as a buffer to let the foam that surrounds the electronics box 200, which is thicker, absorb the energy first, thus decreasing the energy that the foam beneath the electronics box 200 need to absorb, and passing less energy to the head of the rider.

Figure 9A:
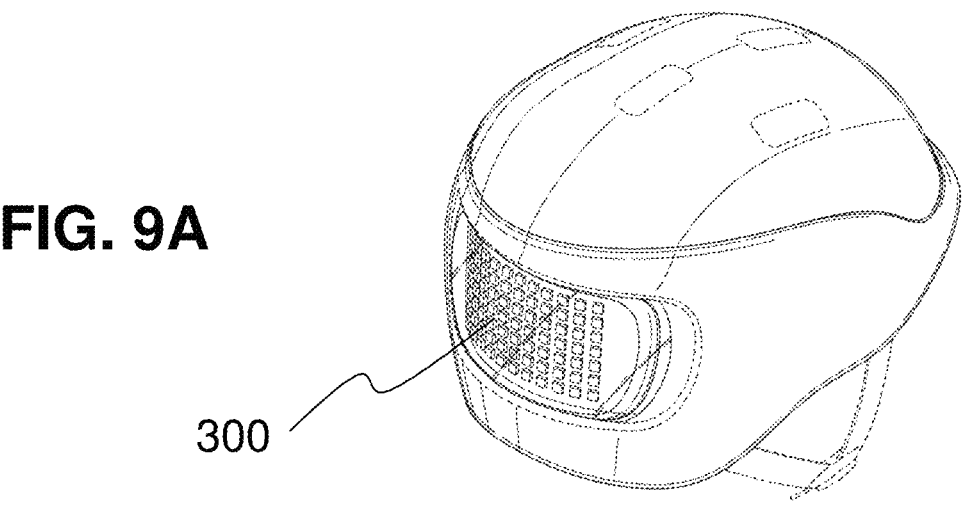
FIGS. 9A and 9B depict different views of the protective helmet in accordance with another exemplary embodiment of the present invention where FIG. 9A provides a perspective view while FIG. 9B provide a rear view.
Figure 9B:
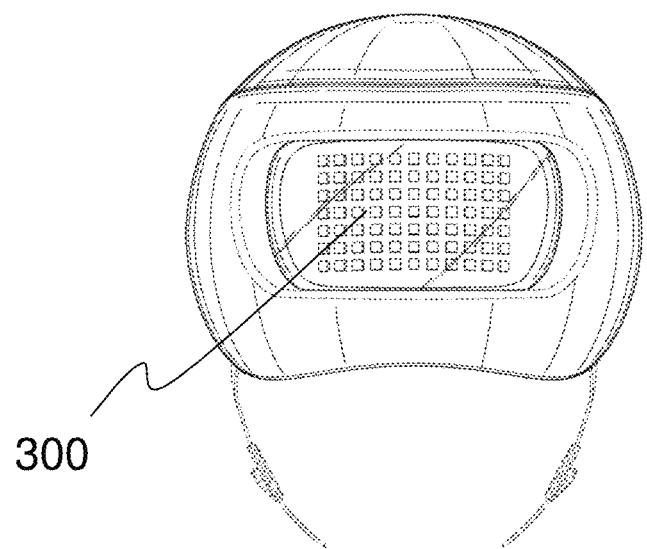

FIGS. 9A and 9B depict a perspective view and a rear view, respectively, of a helmet with a LED display 300 in accordance with one embodiment of the present invention. The LED display 300 comprises a flexible base and a two-dimensional (2D) array of LEDs installed on the flexible base. As seen in FIG. 9A, the LED display 300 is curved to match the curved contour of the helmet. In particular, the LED display 300 is configured to produce visual information to vehicles and pedestrians surrounding the rider, causing the rider to be able to communicate with the surrounding vehicles and pedestrians using contextual display contents including graphical, textual and/or animated signs to thereby promote safety to the rider. In some embodiments, the processor of the designated mobile computing device is configured to provide the contextual display contents to the LED display. The graphical, textual and/or animated signs to be displayed in the LED display 300 may be configured and input using the designate mobile computing device through the communication module, and stored in the control module. For example, if a motorist is driving too closely to the rider as detected by the proximity sensor, the LED display may display a "Danger" warning sign to warn the motorist to keep a further distance. On the other hand, when the rider perceives safe road manner of a motorist, the rider may command the LED display to display a message of compliment.

In one mode of operation, the control module may be configured to control the LED display to display a logo to identify the rider from other members of a riding group; and the communication module is configured to establish a point-to-multipoint communication group such that the rider can transmit or receive real-time and/or just-in-time information to other members of the riding group. For example, a member leading the group may command the LED display to display navigational directions (e.g. turn left/right ahead) and oncoming road condition (e.g. "Steep Downward Slop Ahead"). The communication modules of the one or more members' helmets can be configured in master-slave mode in which the contents displayed in the master helmet's LED display is propagated to one or more slave helmets' LED displays. In other words, the point-to-multipoint communication group is configured in master-slave mode in which the contextual display contents displayed in a master helmet's LED display is propagated to one or more slave helmets' LED displays. In another example, a group member may send a distress signal to the group when there is an accident. The control module is configured to control the LED display to display the distress signal. The communication modules of the one or more members' helmets can be configured such that the distress signal, identifying which member needs help and what kind of help, gets propagated to the one or more slave helmets' LED displays Preferably, the LED display 300 may include a configuration of 7 by 11 array optimized to strike a balance between the visible distance range of the helmet and power consumption of the LED display while providing a sufficiently rich contextual display content. As the number of LEDs increases beyond that of the 7 by 11 array, the power consumption becomes excessive or each LED becomes dimmer without a proportionally increased available electrical current. The particular configuration of 7 by 11 array also allows the optimized display of text (e.g. simultaneous display of two letters scrolling smoothly).

Figure 10:
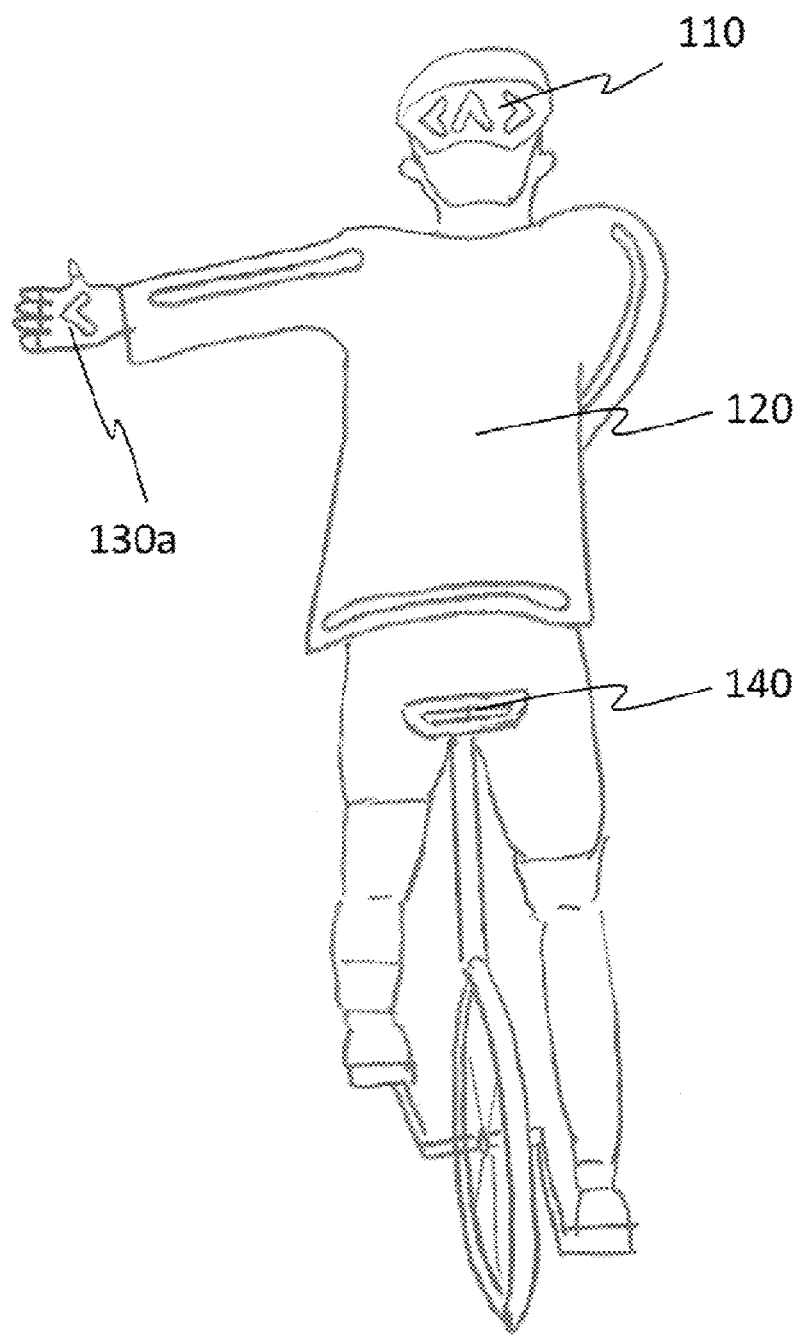
FIG. 10 depicts a protective wearable system in accordance with an exemplary embodiment of the present invention.

FIG. 10 depicts a protective wearable system 100 with illuminated wearables and accessories in accordance with an exemplary embodiment of the present invention. The protective wearable system comprises a helmet 110 according to any embodiment disclosed in the first and second aspects of the present invention, and illuminated wearables and accessories for clearly depicting the silhouette of a rider and making the rider more visible and identifiable to nearby motorists. The illuminated wearables and accessories may include a jacket 120, a pair of gloves including a left glove 130a and a right glove (not shown), a bicycle seat 140, and a backpack (not shown).

Figure 11A:
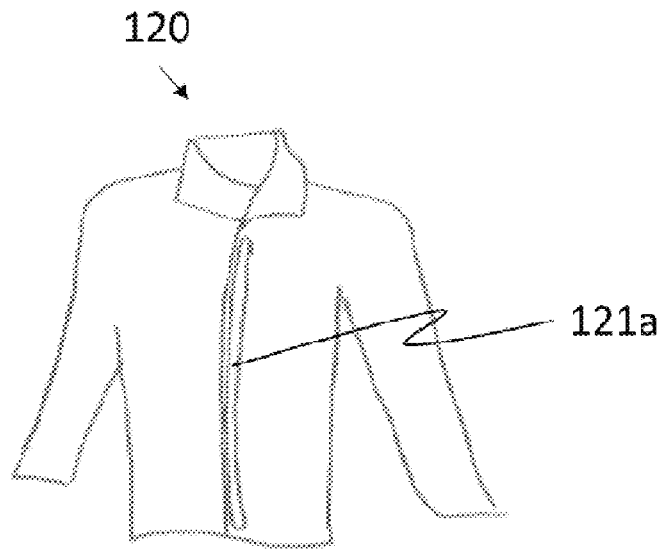
FIGS. 11A and 11B depict different views of a jacket of the protective wearable system in accordance with an exemplary embodiment of the present invention, wherein FIG. 11A provides a front view and FIG. 11B provides a rear view.
Figure 11B:
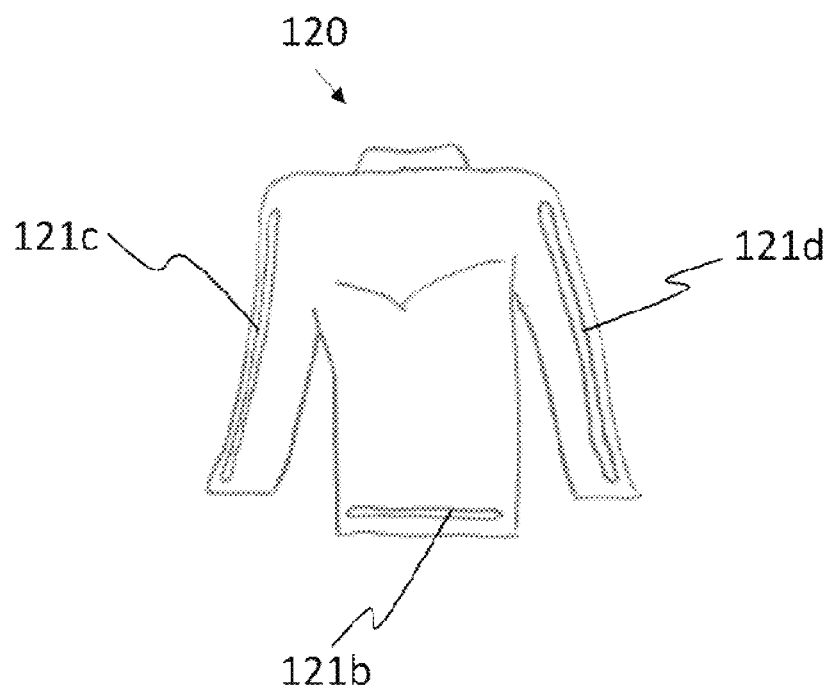

FIGS. 11A and 11B depict front view and rear view, respectively, of the jacket 120 in accordance with an exemplary embodiment of the present invention. The jacket 120 comprises a first LED strip 121a running from the chest part to the abdomen part of the jacket and a second LED strip 121b running across the lower back of the jacket. Optionally, the jacket may further comprise two LED strips 121c and 121d running from the collar to the left wrist part and right wrist part of the jacket respectively, which will be used to display the left and right turn signals respectively.

Figure 12:
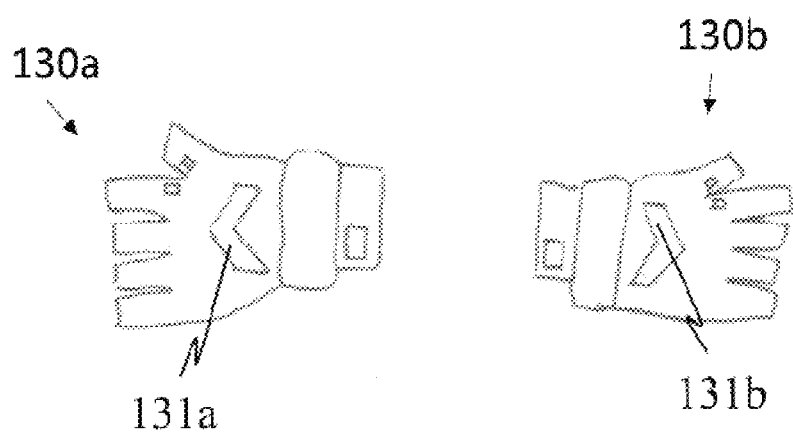
FIG. 12 depicts a pair of gloves of the protective wearable system in accordance with another exemplary embodiment of the present invention.

FIG. 12 depicts the pair of gloves including the left glove 130a and right glove 130b in accordance with an exemplary embodiment of the present invention. Each of the left glove 130a and right glove 130b comprises LED patterns 131a and 131b respectively, such as arrows, for indicating a left or right turn signal. Each of the pair of gloves may comprise a sensing module for picking up the rider's intention to indicate a left or a right turn. In one option, the sensing module may include a magnetic sensor, such as Hall Effect sensor, positioned on the thumb portion of the glove, and a magnet positioned on the index finger portion of the glove. Alternatively, the sensing module may include a 3-axis accelerometer configured in the glove to sense different orientation of a hand of the rider.

Figure 13:
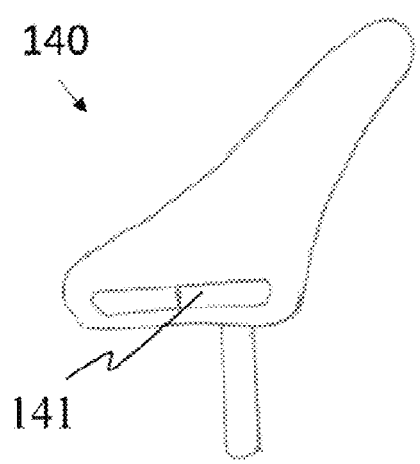
FIG. 13 depicts a bicycle seat of the protective wearable system in accordance with an exemplary embodiment of the present invention.

FIG. 13 depicts the bicycle seat 140 in accordance with an exemplary embodiment of the present invention. The bicycle seat 140 comprises a LED strip 141 installed on the rear side of the bicycle seat. The bicycle seat LED strip 141 may include a red LED strip positioned at a center part for indicating a brake signal, and two yellow LEDs positioned at the left and right side of the bicycle seat respectively for indicating left and right turn signals.

Figure 14:
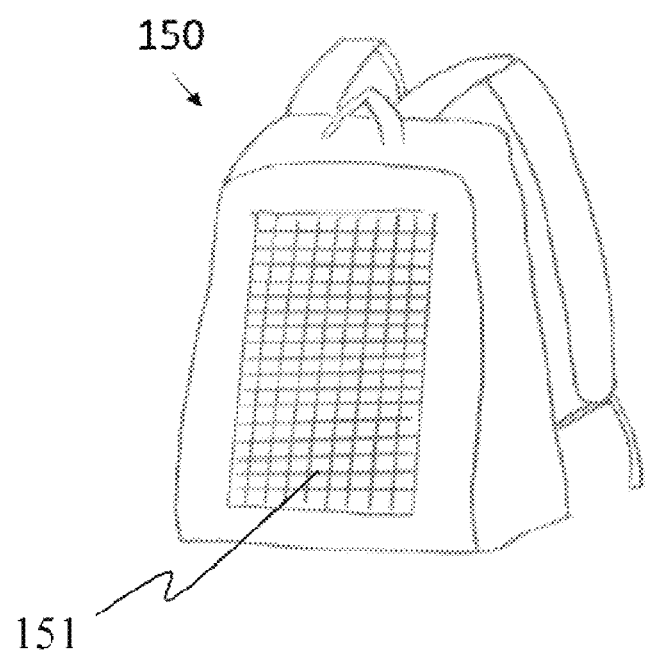
FIG. 14 depicts a backpack of the protective wearable system in accordance with an exemplary embodiment of the present invention.

FIG. 14 depicts a backpack 150 in accordance with an exemplary embodiment of the present invention. The back pack 150 may comprise a 2D array of RGB LED panel 151 for displaying graphical and/or textual signs.

The control module may be configured to synchronize the wearables and accessories of the protective wearable system to a master device, which is by default the helmet, but can be any other wearables and accessories in the protective wearable system.

The control module may be configured to control each the illuminated wearables and accessories, when detecting the rider's intention to indicate a turn signal, to display turn signals. If a rider indicates a turn signal with one of the illuminated wearables and accessories, the indicated turn signal will be relayed to other illuminated wearables and accessories of the system and be displayed on all illuminated wearables and accessories of the system.

The protective helmet system and the protective wearable system may have a plurality of operation modes including, but not limited to, an individual riding mode and a group riding mode. The operation modes may be selected with the designated mobile computing device through the communication module and stored in the control module.

There are several events that can trigger different operation modes of the protective helmet system.

1. In one event that the rider is slowing down, the one or more motion sensors in the electronics box 70 will sense the deceleration of the bike, and then changes the LED pattern such that the back left LED 65, the back LED 64, the back right LED 63 are kept on until the bicycle comes to a stop; and control the LED display 300 to display a warning sign indicating the deceleration of the vehicle to warn the other members behind to keep a safe following distance.

2. In another event that the rider presses the left button 51 on the remote control 180 to signal to the surrounding that it is turning left, the back LED 64, the left brim LED 671, the front-left LED 66 and the back-left LED 65 keep blinking.

3. In another event when the rider presses the right button 52 on the remote control 180 to signal to the surrounding that it is turning right, the back LED 64, the right brim LED 672, the front-right LED 66 and the back-right LED 65 keep blinking.

4. In another event when the control module detects an approaching vehicle via the one or more proximity sensors 77, the control module will control the center brim LED 66 to blink and increase the brightness of the LED strip 60. The control module will also trigger the one or more vibration motors 79 to vibrate and the one or more speakers 78 to emit alarming sound thus to notify the rider.

5. In another event when the control module detects a motorist driving too closely to the rider via the proximity sensors 77, the control module will control the LED display 300 to display a "Danger" warning sign to warn the motorist to keep a further distance.

6. In another event when the rider experiences safe behavior from another rider, the control module will trigger the LED display 300 to display a thankful or complimentary note to encourage such behavior.

There are several events that can trigger different operation modes of the protective wearable system.

1. In the event when the control module detects an approaching vehicle via the one or more proximity sensors 77, the control module will control the one or more wearables and accessories of the protective wearable system to blink in a synchronized mode for making the rider more visible and identifiable to nearby motorists.

2. In another event that the rider raises his/her left arm to signal to the surrounding that it is turning left, the sensing module in the left glove 130a will sense the rider's intention to indicate a left turn signal, and the control module will control the LED pattern 131a of the left glove 130a, the LED strip 121c running from the collar to the left wrist part of the jacket 120, and the yellow LED positioned at the left side of the bicycle seat 140 to produce light signals for indicating a left turn signal to the surrounding.

3. In another event that the rider raises his/her right arm to signal to the surrounding that it is turning right, the sensing module in the right glove 130b will sense the rider's intention to indicate a right turn signal, and the control module will control the LED pattern 131b of the right glove 130b, the LED strip 121d running from the collar to the right wrist part of the jacket 120, and the yellow LED positioned at the right side of the bicycle seat 140 to produce light signals for indicating a right turn signal to the surrounding.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

What is claimed is:

1. A helmet system for providing protection and enhancing safety to a rider on a vehicle, comprising:
    a helmet having a curved surface contour, comprising a shell and a liner configured to protect a head of the rider being situated inside the shell, the liner including a high-density, impact-absorption foam;
    an electronics box integrated within the liner foam, comprising:
        a box cover having at least one wing that extends to contact the helmet of the helmet and
        a collapsible cavity situated between the bottom of the electronic box and the liner foam, the wing being configured to transfer collision impact energy to the liner foam while the cavity is configured to collapse to absorb collision energy;
    a control module and a communication module, both housed in the electronics box;
    a curved LED display installed on the rear of the helmet, comprising a flexible base and a two-dimensional (2D) array of LEDs installed on the flexible base,
        wherein the curved LED display conforms to the curved surface contour of the helmet, and
        wherein the curved LED display is configured to produce visual information to other vehicles and pedestrians around the rider, allowing the rider to communicate with the other vehicles and pedestrians with contextual display contents including one or more of graphical, textual and/or animated signs to thereby promote safety to the rider; and
    a mobile computing device having at least a processor configured to provide the contextual display contents to the LED display;
    wherein the control module is configured to control the communication module to establish a point-to-multipoint communication in a master-slave mode for a group riding in which contents displayed in a master helmet's LED display is propagated to one or more slave helmets' LED displays.

2. The helmet system of claim 1, wherein the control module is configured to:
    control the LED display to display a logo to identify the rider from other members of a riding group; and
    control the communication module to establish a point-to-multipoint communication group such that the rider can transmit and receive real-time and just-in-time information to and from other members of the riding group;
    wherein the real-time and just-in-time information comprise one or more of oncoming road conditions and navigational directions.

3. The helmet system of claim 1, wherein the control module is configured to
    control the LED display to display a logo to identify the rider from other members of a riding group; and
    control the communication module to establish the point-to-multipoint communication group such that the rider can transmit and receive real-time and just-in-time information to and from other members of the riding group;
    wherein the real-time and just-in-time information comprise one or more of oncoming road conditions and navigational directions.

4. The helmet system of claim 1, further comprising one or more proximity sensors; wherein the control module is configured to, when a motorist is driving too closely to the rider as detected by the proximity sensor, control the LED display to display a "Danger" warning sign to warn the motorist to keep a further distance.

5. The helmet system of claim 1, wherein the control module is configured to, when the rider perceives safe road manner of a motorist, allow the rider to command the LED display to display a message of compliment.

6. The helmet system of claim 1, wherein the LED display has a configuration of 7 by 11 array.

7. The helmet system of claim 1, further comprising a LED strip installed on the helmet, comprising a flexible base and a plurality of LEDs installed on the flexible base, wherein the LED strip is configured to produce light signals to vehicles and pedestrians surrounding the rider, causing the rider to be more visible to the surrounding vehicles and pedestrians to thereby promote safety to the rider.

8. A protective wearable system comprising:
    the helmet of claim 1 being worn on a rider's head; and
    one or more illuminated wearables and accessories configured to produce light signals for clearly depicting silhouette of the rider;
    wherein the light signals of the one or more illuminated wearables and accessories are synchronized to illumination of the helmet for making the rider more visible and identifiable to nearby motorists.

9. The helmet system of claim 1, wherein the control module is configured to, when there is an accident, control the LED display to display a distress signal and control the communication module to propagate the distress signal to one or more helmets' LED displays of other members in the riding group.

10. The helmet system of claim 7, wherein the plurality of LEDs includes a front-right LED, a back-right LED, a back LED, a back-left LED, a front-left LED, a left brim LED, a right brim LED and a center brim LED.

11. The helmet system of claim 10, wherein:
    each of the front-right LED and the front-left LED is a super-bright dual-color orange and white LED;
    the back-right LED and the back-left LED are super bright orange LEDs;
    the back LED is a super bright red LED;
    the left brim LED and the right brim LED are orange LEDs; and
    the center brim LED is red.

12. The helmet system of claim 10, wherein the control module is configured to, when the rider is biking straight, control the LED strip such that the back LED is blinking, causing the rider to become more visible to the surrounding vehicles and pedestrians.

13. The helmet system of claim 10, wherein:
the electronics box further comprises one or more vibration motors and one or more speakers; and
the control module is configured to, when detecting an approaching vehicle via the one or more proximity sensors, control the center brim LED to blink, increase the brightness of the LED strip, and trigger the one or more vibration motors to vibrate and the one or more speakers to emit alarming sound thus to notify the rider.

14. The helmet system of claim 10, wherein
the electronics box further comprises one or more motion sensors; and
the control module is configured to, when the one or more motion sensors senses deceleration of the vehicle, keep the back left LED, the back LED, the back right LED on until the vehicle comes to a stop; and control the LED display to display a warning sign indicating the deceleration of the vehicle to warn the other members behind to keep a safe following distance.

15. The protective wearable system of claim 8, wherein the one or more illuminated wearables and accessories include a jacket comprising a first LED strip running from a chest part to an abdomen part of the jacket and a second LED strip running across the lower back of the jacket.

16. The protective wearable system of claim 8, wherein the one or more illuminated wearables and accessories include a pair of gloves including a left glove and a right glove, wherein each of the left glove and the right glove comprising
a LED pattern for indicating a left right turn signal or right turn signal; and
a sensing module for detecting the rider's intention to indicate a left or a right turn.

17. The protective wearable system of claim 8, wherein the one or more illuminated wearables and accessories include a bicycle seat comprising a LED strip installed on a rear side of the bicycle seat, wherein the LED strip of the bicycle seat comprises
a red LED strip positioned at a center part of the bicycle seat for indicating a brake signal; and
two yellow LEDs positioned at a left side and a right side of the bicycle seat respectively for indicating a left turn signal and a right turn signal respectively.

18. The protective wearable system of claim 15, wherein the jacket further comprises two LED strips running from a collar of the jacket to a left wrist part and a right wrist part of the jacket respectively for displaying a left turn signal and a right turn signal respectively.

19. A helmet system for providing protection and enhancing safety to a rider on a vehicle, comprising:
a helmet having a curved surface contour, comprising a shell and a liner configured to protect a head of the rider being situated inside the shell, the liner including a high-density, impact-absorption foam;
an electronics box integrated within the liner foam, comprising:
a box cover having at least one wing that extends to contact the helmet of the helmet; and
a collapsible cavity situated between the bottom of the electronic box and the liner foam, the wing being configured to transfer collision impact energy to the liner foam while the cavity is configured to collapse to absorb collision energy;
a control module and a communication module, both housed in the electronics box;
a curved LED display installed on the helmet, comprising a flexible base and a two-dimensional (2D) array of LEDs installed on the flexible base,
wherein the curved LED display conforms to the curved surface contour of the helmet, and
wherein the curved LED display is configured to produce visual information to other vehicles and pedestrians around the rider, allowing the rider to communicate with the other vehicles and pedestrians with contextual display contents including one or more of graphical, textual and/or animated signs to thereby promote safety to the rider; and
a mobile computing device having at least a processor configured to provide the contextual display contents to the LED display.

* * * * *